United States Patent
Moore et al.

(10) Patent No.: US 10,618,518 B2
(45) Date of Patent: Apr. 14, 2020

(54) SYSTEM AND METHOD FOR DETERMINING BRAKE BOOSTER PRESSURE

(71) Applicant: Ford Global Technologies, LLC, Dearborn, MI (US)

(72) Inventors: Ian Moore, Pulheim (DE); Matthias Baumann, Cologne (DE); Christian Schmaler, Aachen (DE); Martin Knuettel, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 15/293,178

(22) Filed: Oct. 13, 2016

(65) Prior Publication Data

US 2017/0106870 A1   Apr. 20, 2017

(30) Foreign Application Priority Data

Oct. 14, 2015   (DE) .................. 10 2015 219 943

(51) Int. Cl.
*B60W 30/18* (2012.01)
*F02N 11/08* (2006.01)
(Continued)

(52) U.S. Cl.
CPC ....... *B60W 30/18109* (2013.01); *B60T 13/52* (2013.01); *B60T 13/662* (2013.01); *B60T 13/683* (2013.01); *B60T 13/72* (2013.01); *B60T 17/22* (2013.01); *B60W 10/06* (2013.01); *B60W 10/188* (2013.01); *F02N 11/084* (2013.01); *B60W 2510/0671* (2013.01);
(Continued)

(58) Field of Classification Search
CPC ..... B60W 30/18109; B60W 30/18054; B60W 10/188; B60W 10/06; B60W 2510/0671; B60W 2510/182; B60W 2710/182; B60T 13/683; B60T 13/72; B60T 13/662; B60T 13/52; B60T 17/22; F02N 2200/0807
See application file for complete search history.

(56) References Cited

U.S. PATENT DOCUMENTS 6,033,038 A  *  3/2000  Kulkarni ................. B60T 8/442
                                                                303/113.3
8,989,992 B2     3/2015  Lippok
(Continued)

FOREIGN PATENT DOCUMENTS

DE         102011110699 A1      2/2013

*Primary Examiner* — Jacob S. Scott
*Assistant Examiner* — Lori Wu
(74) *Attorney, Agent, or Firm* — Raymond L. Coppiellie; Burgess Law Office, PLLC

(57) ABSTRACT

A method and system for determining the pressure in a brake booster used to actuate a brake system having at least one main brake cylinder. The brake booster connected in a fluid-conducting manner by a non-return valve to an intake manifold of an internal combustion engine. A reduced pressure loss in the brake booster resulting from actuation of the main brake cylinder is balanced with the reduced pressure gain in the brake booster as a result of a pressure difference between the brake booster pressure and the intake manifold pressure. The reduced pressure gain in the brake booster is determined based on time, the air mass flow between the brake booster, and the intake manifold.

11 Claims, 3 Drawing Sheets

(51) Int. Cl.
*B60T 13/52* (2006.01)
*B60T 13/66* (2006.01)
*B60T 17/22* (2006.01)
*B60T 13/68* (2006.01)
*B60T 13/72* (2006.01)
*B60W 10/06* (2006.01)
*B60W 10/188* (2012.01)

(52) U.S. Cl.
CPC ... *B60W 2510/182* (2013.01); *B60W 2550/12* (2013.01); *B60W 2710/182* (2013.01); *F02N 2200/0807* (2013.01); *Y02T 10/48* (2013.01)

(56) References Cited

U.S. PATENT DOCUMENTS

| | | | |
|---|---|---|---|
| 2005/0218716 A1* | 10/2005 | Collins | B60T 13/72 303/115.3 |
| 2008/0275617 A1 | 11/2008 | Kirmess et al. | |
| 2010/0332097 A1* | 12/2010 | Lippok | B60T 13/662 701/70 |
| 2012/0116656 A1* | 5/2012 | Martin | B60T 13/662 701/110 |
| 2015/0000634 A1* | 1/2015 | Martin | B60T 17/02 123/323 |

* cited by examiner

SYSTEM AND METHOD FOR DETERMINING BRAKE BOOSTER PRESSURE

CROSS-REFERENCE TO RELATED APPLICATIONS

Not Applicable.

BACKGROUND OF THE INVENTION

1. Field of the Invention

The invention relates to a vehicle brake system, and more specifically, to a system and method for determining the pressure in a brake booster.

2. Description of Related Art

In motor vehicles with an automatic start/stop system, the internal combustion engine or the combustion motor can be automatically stopped or switched off when no drive power is required, for example, when waiting in front of a traffic light. The internal combustion engine is automatically restarted when the driver requests drive power. Such a start/stop operation cuts fuel consumption and pollutant and noise emissions.

In motor vehicles with an automatic start/stop system and a low-pressure brake booster used to actuate a brake system of the motor vehicle through a main brake cylinder, the pressure or reduced pressure in the brake booster must be monitored to ensure there is enough auxiliary braking force available. When the internal combustion engine is the only reduced pressure or vacuum source for the brake booster reduced pressure is not produced when the engine is not running. The reduced pressure or vacuum in the brake booster is rapidly reduced when the driver actuates the brake, typically to a value at which the auxiliary braking force is inadequate. This is undesirable not only for safety reasons but also in that the driver should notice effects of the automatic start/stop system to the smallest possible extent.

To start the internal combustion engine quickly again, a reduced pressure sensor could be provided on the brake booster and the current reduced pressure value could be compared with a threshold value, where the internal combustion engine would be started again when the reduced pressure value falls below the threshold value. However, such a sensor means more hardware complexity and increased expense.

SUMMARY OF THE INVENTION

A method for determining brake booster pressure including balancing a reduced pressure loss in the brake booster with a reduced pressure gain in the brake booster resulting from a pressure difference between a brake booster pressure and an intake manifold pressure and calculating the reduced pressure gain in the brake booster based on an air mass flow between the brake booster and an intake manifold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
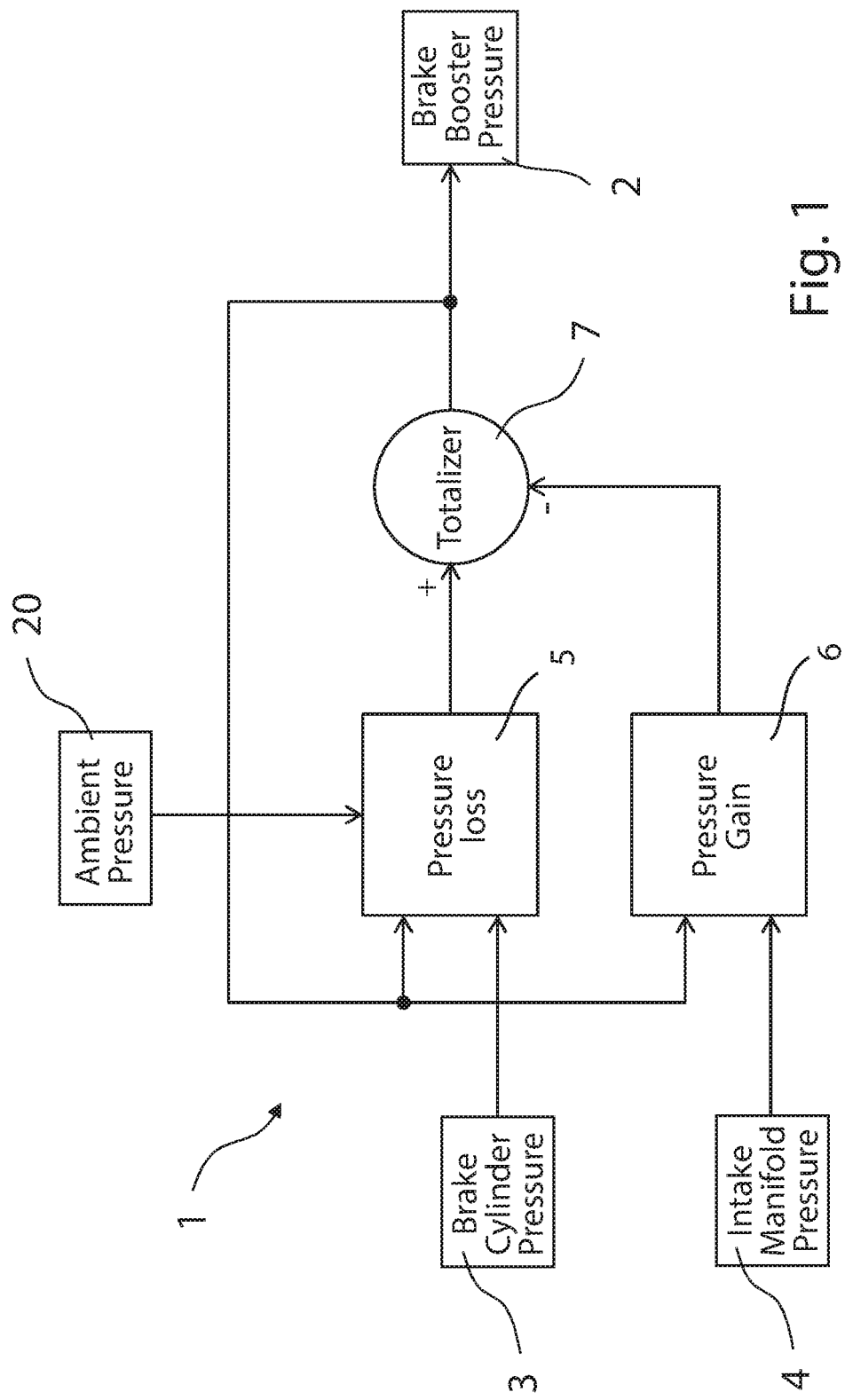
FIG. 1 is a schematic diagram of a system for determining the pressure in a brake booster based a hydraulic pressure present in a main brake cylinder, an ambient pressure present in the environment of the brake booster, and an intake manifold pressure present in an intake manifold according to one example of the invention.

FIG. 1 is a schematic diagram of a system 1 for determining the pressure $p_{bo}(t)$ 2 in a brake booster (not shown) with reference to a hydraulic pressure 3 present in a main brake cylinder (not shown), an ambient pressure 20 present in the environment of the brake booster, and an intake manifold pressure 4 present in an intake manifold (not shown) according to one example of the present invention. The brake booster actuates a brake system (not shown) of a motor vehicle using the main brake cylinder. The brake booster connected in a fluid-conducting manner through a non-return valve to the intake manifold of an internal combustion engine of the motor vehicle. The non-return valve arranged and constructed to permit airflow from the brake booster to the intake manifold but to prevent airflow from the intake manifold to the brake booster.

The brake booster $p_{bo}(t)$ 2, the ambient pressure 20, and the intake manifold pressure $p_{MAP}(t)$ 4 are each absolute pressures. An intake manifold pressure sensor arranged in the intake manifold and supplied to a control device detects the intake manifold pressure $p_{MAP}(t)$ 4. The control device connected to the intake manifold pressure sensor, for example, directly by means of hard wiring or with a communication bus, like, for example, CAN. In a similar manner, a hydraulic pressure sensor detects the hydraulic pressure 3, and an ambient pressure sensor detects the ambient pressure 20 and each sensor hard-wired to the control device or connected by the communication bus.

FIG. 1 shows the hydraulic pressure 3, the ambient pressure 20 and the intake manifold pressure $p_{MAP}(t)$ 4 are the only input variables use for generating the brake booster pressure 2. The hydraulic pressure 3 and the ambient pressure 20 are used in calculating the reduced pressure loss 5 in the brake booster resulting from actuation of the main brake cylinder. Such a calculation can be carried out, for example, under the method shown in U.S. Pat. No. 8,989,992 B2 assigned to the assignee of the present application, the entire content of which is incorporated herein by reference. Preferably, the reduced pressure loss in the brake booster is calculated based on the hydraulic pressure present in the main brake cylinder and the ambient pressure present in the environment of the brake booster, where the achievement of a so-called level control point ("run out") of the brake booster is also taken into account. Such a method is shown in the patent mentioned above.

As shown in FIG. 1, the intake manifold pressure $p_{MAP}(t)$ 4 is used to calculate the reduced pressure gain 6 in the brake booster based on a pressure difference between the brake booster pressure $p_{bo}(t)$ 2 and the intake manifold pressure $p_{MAP}(t)$ 4. The reduced pressure loss 5 and the reduced pressure gain 6 are balanced in a totalizer 7. Where the time progression of the reduced pressure loss 5 and the time progression of the reduced pressure gain 6 are totaled continuously or almost continuously by the totalizer 7, with the reduced pressure loss 5 having a transposed prefix with respect to the reduced pressure gain 6. The current brake booster pressure $p_{bo}(t)$ 2 is produced from the temporarily continuous or almost continuous balance of the reduced pressure loss 5 and the reduced pressure gain 6 in the brake booster.

FIG. 1 shows the brake booster pressure $p_{bo}(t)$ 2 determined above used in determining the reduced pressure loss 5 and the reduced pressure gain 6.

Figure 2:
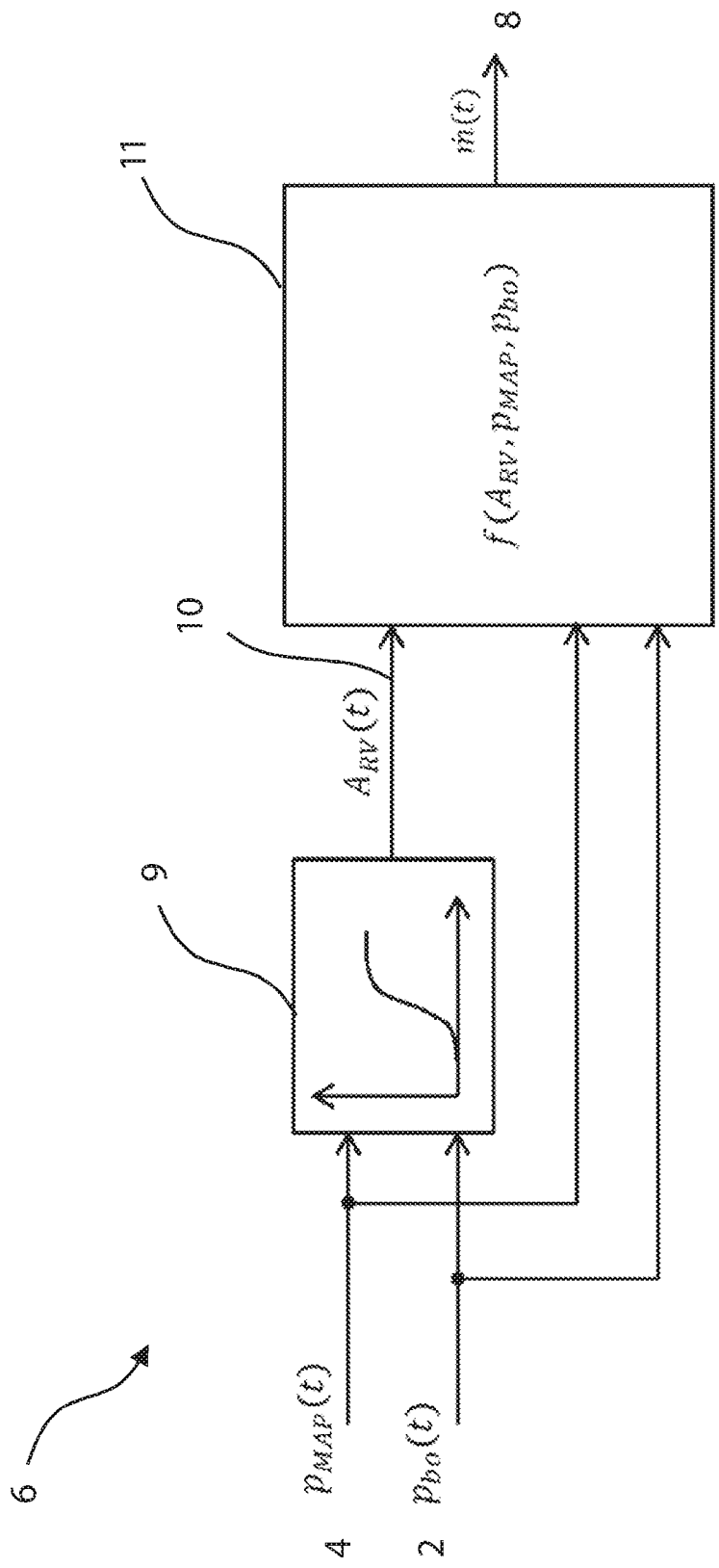
FIG. 2 is a schematic diagram illustrating a system for determining a reduced pressure gain in the brake booster according one example of the invention.

FIG. 2 is a schematic diagram showing calculation of the reduced pressure gain 6 in the brake booster. Calculation of the reduced pressure gain 6 in the brake booster uses the time progression of the air mass flow 8 between the brake booster and the intake manifold, and considers the influence of the non-return valve arranged between the brake booster and the intake manifold. In particular, the opening degree of the non-return valve affects the effective flow cross-section 10 between the brake booster and the intake manifold. Function block 9 shows the calculation of the influence of the non-return valve on the airflow mass 8 between the brake booster and the intake manifold. The present example takes into account the air mass flow 8 in the calculation.

FIG. 2 shows the effective flow cross-section 10 released by the non-return valve calculated from the established brake booster pressure $p_{bo}(t)$ 2 and the intake manifold pressure $p_{MAP}(t)$ 4. Function block 11 shows calculation of the air mass flow 8 between the brake booster and the intake manifold.

Figure 3:
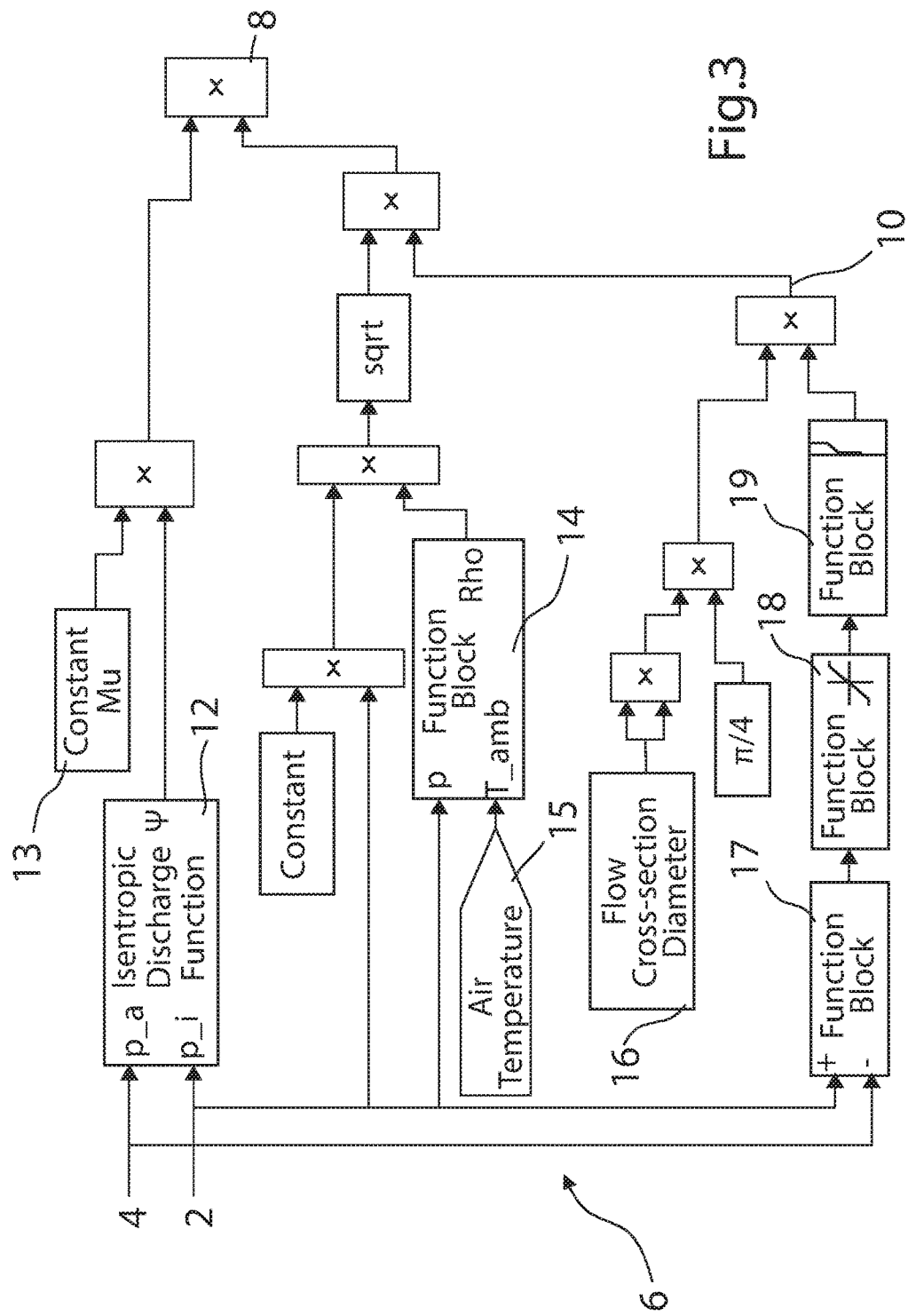
FIG. 3 is a second, more detailed schematic diagram from that shown in FIG. 2 for determining the reduced pressure gain.

FIG. 3 is a second, more detailed schematic showing, from FIG. 2, calculation of the reduced pressure gain 6. As already described, the reduced pressure gain 6 in the brake booster is calculated as a result of a pressure difference between the brake booster pressure $p_{bo}(t)$ 2 and the intake manifold pressure $p_{MAP}(t)$ 4.

FIG. 3 shows function block 12 calculating the isentropic discharge function $\Psi$ with respect to the airflow from the brake booster to the intake manifold based on the input variables brake booster pressure $p_{bo}(t)$ 2 and intake manifold pressure $p_{MAP}(t)$ 4. The calculation of the isentropic discharge function $\Psi$ is known.

The result of the calculation 12 is multiplied in a multiplexer x with a constant $\mu$ 13. All the multiplying function blocks in FIG. 3 are identified with an "x." The constant $\mu$ 13 acts as a correction factor for adaptation or compensation of the calculation illustrated in FIG. 3.

Functional block 14, calculates the air density of the air present in the brake booster or the vacuum chamber. The previously established brake booster pressure $p_{bo}(t)$ 2 and the air temperature 15 (temperature of a dry gas) in the brake booster are included as input variables in the calculation. The air temperature 15 is assumed as a constant and corresponds to the ambient temperature of the brake booster. A corresponding temperature sensor may determine the air temperature 15. The result of the calculation 14 is multiplied with the product of a constant "2" and the previously established brake booster pressure $p_{bo}(t)$ 2. From the result of this multiplication, the square root ("sqrt") is subsequently calculated.

In another step for calculating the effective flow cross-section 10 released by the non-return valve, the diameter 16 of the flow cross-section which can be released at the maximum by the non-return valve is squared and multiplied with the constant "pi/4" which provides the maximum flow cross-section surface-area.

Function block 17 calculates the difference from the previously established brake booster pressure $p_{bo}(t)$ 2 and the intake manifold pressure $p_{MAP}(t)$ 4. This value is supplied as an input variable to function block 18 to limit the pressure difference previously calculated in function block 17. In function block 18, the closure property of the non-return valve is considered. Function block 18 uses the property of the non-return valve that permits a flow direction of the air mass flow from the brake booster to the intake manifold, open position of the non-return valve, and prevents flow in the opposite direction, closure position of the non-return valve.

Function block 19 calculates the relative opening degree of the non-return valve in accordance with the limited pressure difference previously established in function block 18 with respect to a maximum opening of the non-return valve. The relative value is multiplied by the previously determined maximum flow cross-section and produces the current effective flow cross-section 10 of the non-return valve according to the current pressure difference between the brake booster and the intake manifold.

The effective flow cross-section 10 is subsequently multiplied with the previously established result of the square root extraction obtained with function block 14 and with the result established at the beginning regarding multiplication of the discharge function $\Psi$ of function block 12 with the constant 13 in order to finally obtain the air mass flow 8.

In one example, the system and method are used with a motor vehicle having an automatic start/stop system to determine when to restart the internal combustion engine. The method determines when an engine control of the internal combustion engine operates the internal combustion engine such that, in the intake manifold of the internal combustion engine a smaller intake manifold pressure for the reduced pressure gain in the brake booster is provided to reduce the brake booster pressure. The system includes a control device, a hydraulic pressure sensor to determine a hydraulic pressure present in a main brake cylinder, an ambient pressure sensor for determining the ambient pressure present in the environment of the brake booster, and an intake manifold pressure sensor for determining an intake manifold pressure present in an intake manifold.

It is for example, conceivable for determining the intake manifold pressure present in the intake manifold in a purely mathematical manner, for example, based on the speed of the internal combustion engine and/or the air mass flow present in the intake manifold instead of by an intake manifold pressure sensor. One example mathematically determines the pressure in a brake booster of a hydraulic motor vehicle brake system.

In one example, the method determines the pressure, in particular the reduced pressure, in a reduced pressure brake booster used to actuate a brake system. The reduced pressure brake booster connected to a brake cylinder, with a non-return valve connecting the brake cylinder in a fluid-conducting manner to an intake manifold of an internal combustion engine. A reduced pressure loss in the brake booster resulting from actuation of the main brake cylinder is balanced with a reduced pressure gain in the brake booster as a result of a pressure difference between the brake booster pressure and the intake manifold pressure.

Generally, each actuation of the main brake cylinder or each brake request using the brake system, leads to a reduced pressure loss in the brake booster. The corresponding pressure difference between the brake booster pressure and the intake manifold pressure makes it is possible to achieve a reduced pressure gain in the brake booster and improve the brake support force because the brake booster connects to the intake manifold in a fluid-conducting manner through the non-return valve.

To determine the current brake booster pressure, the above-mentioned reduced pressure loss in the brake booster is balanced in the brake booster with the above-mentioned reduced pressure gain. The balancing, the time progression of the reduced pressure loss, and the time progression of the reduced pressure gain are continuously or almost continuously totaled, wherein the reduced pressure loss has a transposed prefix with respect to the reduced pressure gain. From the temporarily continuously or almost continuously established mathematical balance of the reduced pressure loss and the reduced pressure gain in the brake booster, it is consequently possible to calculate or estimate at any time the pressure currently present in the brake booster, the reduced pressure available to support the braking force.

The present example includes calculating the reduced pressure gain in the brake booster using the time progression of the air mass flow between the brake booster and the intake manifold. This enables a simple but very precise calculation of the resulting pressure present in the brake booster, in particular the reduced pressure.

Current brake booster pressure, for example, is already known from the earlier calculation. Because the air mass flow between the brake booster and the intake manifold is determined by the current pressure difference between the brake booster pressure and the intake manifold pressure, calculating the reduced pressure gain in the brake booster requires only the current intake manifold pressure as an additional input variable.

The intake manifold pressure in the intake manifold can be found, for example, using an intake manifold pressure sensor, present in modern vehicles. So the vehicle requires no additional hardware, but instead can be implemented in software alone, for example, with an electronic control device of the vehicle, preferably with an electronic brake control device, like, for example, an ESP control device (ESP: electronic stability program). Consequently, the stopped time of the internal combustion engine can be optimized in a simple and precise manner and so the fuel consumption and the pollutant emission can be decreased.

In a further example, the reduced pressure gain in the brake booster is determined in accordance with a degree of opening of the non-return valve. The precision of the calculation of the reduced pressure gain as a result of a pressure difference between the brake booster pressure and the intake manifold pressure is improved as the non-return valve represents, in accordance with the degree of opening, a more or less large obstacle for the air mass flow between the brake booster and the intake manifold. The non-return valve causes a pressure loss at the non-return valve.

A further example includes calculating the degree of opening of the non-return valve based on the pressure difference between the brake booster pressure and the intake manifold pressure. Since the degree of opening is calculated from this pressure difference alone, no more complex hardware is required to detect the degree of opening of the non-return valve in another manner.

To improve the precision of the calculation of the reduced pressure gain in the brake booster, the reduced pressure gain in the brake booster is calculated to be zero when the intake manifold pressure is greater than or equal to the brake booster pressure. The non-return valve arranged and configured between the brake booster and the intake manifold of the internal combustion engine whereby it prevents an air mass flow from the intake manifold to the brake booster. But, the non-return valve permits an air mass flow from the brake booster to the intake manifold when the brake booster pressure is greater than the intake manifold pressure to a sufficient extent. Depending on the current operating state of the internal combustion engine, there may temporarily be in the intake manifold a higher intake manifold pressure than in the brake booster, for example, with internal combustion engines charged by a turbocharger so that there is no air mass flow from the intake manifold to the brake booster.

In another example, calculation of the air mass flow between the brake booster and the intake manifold uses only the current brake booster pressure and an intake manifold pressure present in the intake manifold as input variables, where the last brake booster pressure determined is the current brake booster pressure. The brake booster pressure already established is regenerated to calculate the current air mass flow.

Precisely calculating the reduced pressure loss in the brake booster provides for calculation of the reduced pressure loss in the brake booster using only a hydraulic pressure present in the main brake cylinder and an ambient pressure present in the environment of the brake booster. The reduced pressure loss in the brake booster is a result of an actuation of the main brake cylinder by the hydraulic pressure present in the main brake cylinder and by the ambient pressure present in the environment of the brake booster. Since the hydraulic pressure in the main brake cylinder can be found, for example, with a hydraulic pressure sensor, typically present in modern vehicles, implementing the present embodiment in such a vehicle requires only a sensor to find the ambient pressure, whereby the additional hardware complexity is reduced.

The reduced pressure loss increases because of the braking force increase by the brake booster with increasing hydraulic pressure in the main brake cylinder generally as far as an upper limit. Upon reaching the level control point ("run out") of the brake booster, when a brake pedal is further actuated and the brake booster cannot supply additional auxiliary braking force, the reduced pressure loss in the brake booster becomes zero. The reduced pressure loss in the brake booster, determined in accordance with the actual hydraulic pressure in the main brake cylinder, takes into account the run out point from which the reduced pressure loss in the brake booster is calculated to be zero.

In the disclosed example, the calculated or determined brake booster pressure set forth above is used to determine, in a motor vehicle with an automatic start/stop mechanism, when the internal combustion engine should be restarted. In particular, the mathematically determined brake booster pressure is compared with a predetermined pressure threshold value, above which the internal combustion engine is restarted to supply the brake booster with pressure. In particular, a reduced pressure or vacuum from the intake manifold sufficient to supply a braking force by the brake booster.

The determined brake booster pressure is a factor in determining when an engine control of the internal combustion engine restarts the internal combustion engine. Specifically, operating the engine provides intake manifold pressure lower than the reduced pressure gain in the brake booster to reduce the brake booster pressure and consequently ensure support of the braking force by the brake booster. This operating mode can be used when the brake booster pressure determined according to the invention is above a predetermined pressure threshold value.

The hydraulic pressure in the main brake cylinder can be found using a hydraulic pressure sensor. The ambient pressure present in the environment of the brake booster can be found using an ambient pressure sensor. The pressure in the intake manifold can be found by using an intake manifold pressure sensor establishing the absolute pressure in the intake manifold.

The method determines the pressure in a brake booster for the calculation of the reduced pressure loss and the reduced pressure gain in the brake booster and at most requires these variables the hydraulic pressure present in the main brake cylinder, the ambient pressure present in the environment of the brake booster, and the intake manifold pressure present in the intake manifold.

The system may include a start/stop control device for the independent restart of an internal combustion engine of a motor vehicle if inadequate pressure in a brake booster occurs. The brake booster actuating a brake system including a main brake cylinder connected in a fluid-conducting manner by a non-return valve to an intake manifold of the internal combustion engine. The intake manifold permitting airflow from the brake booster to the intake manifold and preventing airflow in the opposite direction. A system including a control device and a hydraulic pressure sensor detecting the hydraulic pressure present in the main brake cylinder, an ambient pressure sensor for detecting the ambient pressure present in the environment of the brake booster, and an intake manifold pressure sensor for detecting the intake manifold pressure present in the intake manifold.

The engine control device carries out the method and selects the operating mode of the internal combustion engine. The selection such that if inadequate pressure in a brake booster occurs, an intake manifold pressure that lowers the reduced pressure gain in the brake booster is provided in an intake manifold of the internal combustion engine to reduce the brake booster pressure. The brake booster actuating a brake system using a main brake cylinder connected in a fluid-conducting manner by a non-return valve to an intake manifold of the internal combustion engine allowing airflow from the brake booster to the intake manifold and preventing airflow in the opposite direction. The system including the control device and a hydraulic pressure sensor for detecting the hydraulic pressure in the main brake cylinder, an ambient pressure sensor for detecting the ambient pressure present in the environment of the brake booster, and an intake manifold pressure sensor for detecting the intake manifold pressure present in the intake manifold.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A method for determining a brake booster pressure comprising the steps of:
    balancing a reduced pressure loss in a brake booster with
        a reduced pressure gain in the brake booster resulting from a pressure difference between the brake booster pressure and an intake manifold pressure; and
    calculating the reduced pressure gain in the brake booster based on a time progression of an air mass flow between the brake booster and an intake manifold; and
    wherein determination of the reduced pressure gain in the brake booster is based on a degree of opening of a non-return valve and the degree of opening of the non-return valve is calculated based on the pressure difference between the brake booster pressure and the intake manifold pressure.

2. The method of claim 1 including calculating the reduced pressure gain in the brake booster to be zero when the intake manifold pressure is greater than or equal to the brake booster pressure.

3. The method of claim 1 wherein calculating the air mass flow between the brake booster and the intake manifold uses only current brake booster pressure and intake manifold pressure as input variables, wherein a last brake booster pressure determined is used as the current brake booster pressure.

4. The method of claim 1 wherein an intake manifold pressure sensor detects the intake manifold pressure present in the intake manifold.

5. A method for determining a brake booster pressure comprising the steps of:
    balancing a reduced pressure loss in a brake booster with
        a reduced pressure gain in the brake booster resulting from a pressure difference between the brake booster pressure and an intake manifold pressure; and
    calculating the reduced pressure gain in the brake booster based on a time progression of an air mass flow between the brake booster and an intake manifold; and
    calculating the reduced pressure loss in the brake booster using only a hydraulic pressure present in a main brake cylinder and an ambient pressure present in the environment of the brake booster.

6. The method of claim 5 including using the determined brake booster pressure to decide when an engine control of an internal combustion engine operates the internal combustion engine providing an intake manifold pressure which is lower than the reduced pressure gain in the brake booster to reduce the brake booster pressure.

7. A method for determining a brake booster pressure comprising the steps of:
    balancing a reduced pressure loss in a brake booster with
        a reduced pressure gain in the brake booster resulting from a pressure difference between the brake booster pressure and an intake manifold pressure; and
    calculating the reduced pressure gain in the brake booster based on a time progression of an air mass flow between the brake booster and an intake manifold; and
    using the determined brake booster pressure to decide when an internal combustion engine of a motor vehicle having an automatic start/stop mechanism is restarted.

8. A method for determining a pressure in a brake booster used to actuate a brake system having at least one main brake cylinder, the brake booster connected in a fluid-conducting manner by a non-return valve to an intake manifold of an internal combustion engine, wherein a reduced pressure loss in the brake booster as a result of actuation of the main brake cylinder is balanced with a reduced pressure gain in the brake booster as a result of a pressure difference between a brake booster pressure and an intake manifold pressure comprising:

calculating the reduced pressure gain in the brake booster based on a time progression of an air mass flow between the brake booster and the intake manifold; and determining the reduced pressure gain in the brake booster in accordance with a degree of opening of the non-return valve and the degree of opening of the non-return valve is based on the pressure difference between the brake booster pressure and the intake manifold pressure.

9. A method for determining a pressure in a brake booster used to actuate a brake system having at least one main brake cylinder, the brake booster connected in a fluid-conducting manner by a non-return valve to an intake manifold of an internal combustion engine, wherein a reduced pressure loss in the brake booster as a result of actuation of the main brake cylinder is balanced with a reduced pressure gain in the brake booster as a result of a pressure difference between a brake booster pressure and an intake manifold pressure comprising:

calculating the reduced pressure gain in the brake booster based on a time progression of an air mass flow between the brake booster and the intake manifold; and calculating a reduced pressure loss in the brake booster using only a hydraulic pressure present in the main brake cylinder and an ambient pressure present in an environment of the brake booster.

10. The method of claim 9 including using the brake booster pressure to determine a restart of a motor vehicle having an automatic start/stop mechanism.

11. A method for determining a pressure in a brake booster used to actuate a brake system having at least one main brake cylinder, the brake booster connected in a fluid-conducting manner by a non-return valve to an intake manifold of an internal combustion engine, wherein a reduced pressure loss in the brake booster as a result of actuation of the main brake cylinder is balanced with a reduced pressure gain in the brake booster as a result of a pressure difference between a brake booster pressure and an intake manifold pressure comprising:

calculating the reduced pressure gain in the brake booster based on a time progression of an air mass flow between the brake booster and the intake manifold; and using the brake booster pressure to determine when the engine control of an internal combustion engine operates the internal combustion engine providing in the intake manifold of the internal combustion engine the intake manifold pressure reducing the brake booster pressure.

* * * * *